J. L. CREVELING.
ELECTRIC REGULATION.
APPLICATION FILED OCT. 11, 1910.
1,025,455.
Patented May 7, 1912.
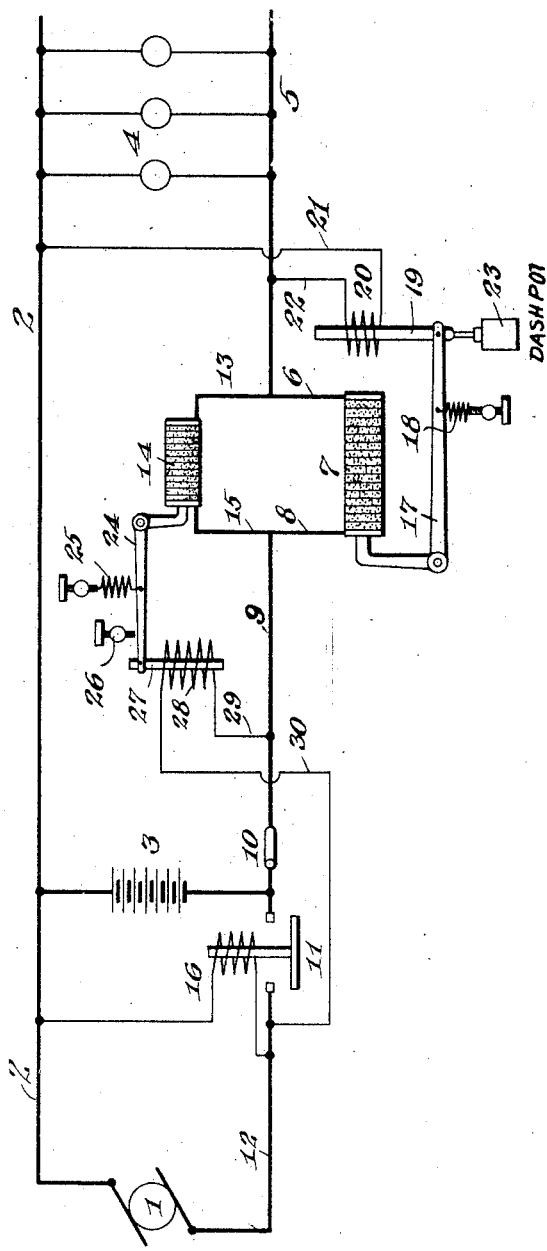
WITNESSES
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,025,455.  Specification of Letters Patent.  Patented May 7, 1912.

Application filed October 11, 1910. Serial No. 586,483.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to automatically regulate an electric circuit in response to changes tending to take place within said circuit.

My invention has for its particular object to provide means whereby the current in a circuit or the voltage across a circuit may be automatically governed in a predetermined manner throughout wide variations or changes at the source from which the circuit is fed, or throughout wide variations or changes of load upon the circuit.

As my invention is particularly applicable to a system wherein a dynamo or generator running at variable speed is employed to charge a storage battery and operate lamps, or other devices, it will be described with reference to such a system.

The drawing is a diagrammatic representation of one type of such system embodying the essentials of my invention.

In the drawing, 1 represents a dynamo or generator, the positive brush of which is connected with the lead 2, which is in communication with the positive side of the storage battery 3, and lamps or translating devices indicated at 4. The negative side of the lamps or translating devices is connected to the main 5, which is connected to the wires 6 and 13. Wire 6 is carried to one end of the carbon pile 7, from the other end of which the wire 8 is carried to the main 9, having in series therewith the hand operated switch 10, and terminating in one terminal of the automatic switch 11 the opposite terminal of which is connected to the generator as by lead 12. The negative side of the storage battery 3 is connected preferably between the switch 11 and switch 10 as shown. Wire 13 is carried to one end of the carbon pile 14, the opposite end of which is connected as by wire 15 with the main 9.

The automatic switch 11 may be of any of the well-known types of automatic switches adapted to connect the generator to the storage battery when the voltage of the generator is substantially equal to that of the battery and to disconnect the generator when its voltage falls below that of the battery. As these switches are well-known in the art, the one indicated in this drawing is shown as provided merely with the actuating coil 16 for the sake of simplicity. The lever 17, normally drawn in a downward direction by adjustable spring 18, tends to compress the carbon pile 7 and reduce the resistance thereof.

19 represents a core of iron or other magnetic material which the solenoid 20 tends to draw in an upward direction when energized. The solenoid 20 is connected across the circuit to be governed as by means of wires 21 and 22.

23 is a dashpot which may be used if desired to prevent too sudden motion of the lever 17. The lever 24 is normally drawn in an upward direction by the adjustable spring 25 which tends to lessen the pressure upon the carbon pile 14 and increase the resistance thereof. The motion in an upward direction which may be given to the lever 24 by the spring 25 may be limited as by the adjustable screw 26.

27 is a core of iron or other magnetic material carried by the lever 24, so arranged that the solenoid 28 when energized tends to draw the core 27 downward, and thus by swinging the lever 24 increase the pressure upon the carbon pile 14, and reduce the resistance thereof. The solenoid 28 is preferably of fine wire connected across the switches 10 and 11, as indicated by wires 29 and 30.

The operation of my invention is substantially as follows:—If the generator be at rest, the switch 11 will be open as shown in the drawing, and if the switch 10 be closed, current will flow from the storage battery 3 through lead 2, translating devices 4, main 5, wires 6 and 13, carbon piles 7 and 14 and wires 8 and 15 to the main 9, thence through switch 10 to the storage battery 3. Current will also flow from the storage battery 3 through lead 2, generator 1, lead 12, wire 30, solenoid 28, wire 29, main 9 to the battery. However this current through solenoid 28 will be small, as the same is preferably a fine winding of high resistance, and will only be consumed when the switch 10 is closed for the purpose of throwing on the lamps and translating devices to be regulated. Current will also flow from the main 2, through wire 21, solenoid 20 and wire 22 to the main 5, and thus the pull on solenoid 20 will depend upon the voltage across the translation circuit to be governed. I now adjust the spring 25 so that the solenoid 28 will draw the core 27 downwardly and compress the carbon pile 14 and reduce the resistance thereof as much as desired. I usually prefer to reduce this resistance to a small quantity under the above conditions when the battery alone is supplying the translating devices. I now adjust the spring 18 so that the resistance 7 which controls the voltage across the solenoid 20 will be such as to produce the normal voltage upon the translation circuit. If now the generator be started, its voltage will rise and this being opposed to the voltage of the battery, will decrease the current passing from the battery through the generator and through the coil 28; this will lessen the pull upon the core 27 and allow the resistance 14 to be increased, throwing more of the load upon the resistance 7. When the voltage of the generator is sufficient to cause the switch 11 to close, there will be practically no current in the coil 28, and 14 will have its maximum resistance. If the speed of the generator now increase so that the same is supplying current to the translation circuit, the voltage across the same will tend to rise, and thus cause the coil 20 to exert a stronger pull upon coil 19 in such a manner as to increase resistance 7 and hold the voltage upon the translating devices constant. If the generator speed be sufficient to charge the battery, a further rise in voltage will take place which will in like manner be compensated for by the resistance 7. If now the generator slow down, so as to cause the voltage across the translation circuit to fall slightly, the coil 20 will allow spring 18 to compress the carbon pile 7 and reduce the resistance thereof in a well-known manner to compensate for such increase and hold the voltage on the translation circuit substantially constant. If now the generator speed fall to where its voltage is equal to that of the battery, any further decrease will gradually shift the load from the generator to the battery and then open the switch 11. The load now being carried by the battery will tend to bring its voltage down quite quickly to the normal and it will thus be desired to reduce the resistance in the translation circuit to an amount less than the minimum resistance of 7. As the generator slows down still further, its voltage will drop below that of the battery and the current flowing in the coil 28 will increase. This will tend to increase the pressure upon the carbon pile 14 as above set forth, and reduce the resistance in the translation circuit by shunting the carbon pile 7. If now the generator shall stop, the coil 28 will exert its maximum effort and compress the carbon pile 14 to its pre-adjusted minimum resistance and thus reduce the resistance in the translation circuit below the minimum of the carbon pile 7, unless the voltage across the translation circuit shall be above the normal, when the carbon pile 7 will have its resistance increased by solenoid 20 and tend to hold the normal voltage constant.

I do not wish in any way to limit myself to the exact details of construction or mode of operation set forth herein, as I have merely shown a diagrammatic representation of one type of system embodying my invention, and it is obvious that wide departure in the way of details may be made without departing from the spirit and scope of the said invention, which is set forth in the following claims:—

1. In a system of electrical distribution comprehending a generator, storage battery and translation circuit, means for regulating the translation circuit comprehending circuit regulating means, means for governing the same, circuit regulating means coöperating therewith in the regulation of the translating circuit and means for controlling the same operated by current flowing back from the battery through the generator.

2. In a system of electrical distribution comprehending a generator, a storage battery, a translation circuit and a switch between the generator and the battery, means for regulating the translation circuit and means for operating the same responsive to differences of potential across said switch.

3. The combination with a supply circuit, a switch controlling the same, a storage battery in operative relation to said supply circuit, a battery circuit and a translation circuit, of means for controlling the translation circuit comprehending regulating means responsive to fluctuations in the translation circuit and regulating means coöperating therewith affected by fluctuations across said switch.

4. In a system of electrical distribution comprehending a generator, a storage battery, a translation circuit and a switch in the generator circuit, means for regulating the translation circuit comprehending a regulating element and means for operating the same responsive to fluctuations in the translation circuit, a regulating element coöperating therewith and means for operating the same responsive to differences in potential between the generator circuit and the battery circuit.

5. In a system of electrical distribution comprehending a generator, a storage battery, a translation circuit and a switch in the generator circuit, means for regulating the translation circuit comprehending a regulating element and means for operating the same responsive to fluctuations in the translation circuit, a regulating element co-operating therewith and means for operating the same comprehending a coil in shunt around said switch.

6. In a system of electrical distribution comprehending a generator, a storage battery, a translation circuit and a switch in the generator circuit, means for regulating the translation circuit comprehending a regulating element and means for operating the same responsive to fluctuations in the translation circuit, a regulating element co-operating therewith to regulate said circuit and means for operating the same comprehending a coil affected by the operation of said switch.

7. In a system of electrical distribution comprehending a generator, a storage battery, a translation circuit and a switch in the generator circuit, means for regulating the translation circuit comprehending a regulating element and means for operating the same responsive to fluctuations in the translation circuit, a regulating element co-operating therewith and means for operating the same comprehending a coil connected to the generator circuit and the battery circuit.

8. In a system of electrical distribution comprehending a generator, a storage battery, a translation circuit and a switch between the generator and the battery, means for regulating the translation circuit affected by a coil connected across said switch.

9. In a system of electrical distribution comprehending a generator, a storage battery, a translation circuit, and a switch between the generator and the storage battery, a coil in shunt thereto and means for regulating the translation circuit affected by said coil.

JOHN L. CREVELING.

Witnesses:
CHAS. McC. CHAPMAN,
A. E. TUERC.

Copies of this patent may be obtained for five cents each, by addressing the "Commissioner of Patents, Washington, D. C."